United States Patent [19]

Shishido et al.

[11] Patent Number: 5,306,001
[45] Date of Patent: Apr. 26, 1994

[54] GAME BALL

[75] Inventors: Hideomi Shishido; Shigeo Doi; Masanori Hirakiuchi; Hajime Okimoto, all of Hiroshima, Japan

[73] Assignee: Molten Corporation, Hiroshima, Japan

[21] Appl. No.: 962,331

[22] Filed: Oct. 16, 1992

[51] Int. Cl.$^5$ ............ A63B 41/02; A63B 41/10; A63B 45/00
[52] U.S. Cl. .................. 273/65 B; 273/65 C; 273/65 EG; 273/58 BA; 273/58 J
[58] Field of Search .............. 273/65 R, 65 E, 58 BA, 273/58 B, 65 A, 65 B, 65 C, 65 D, 65 ED, 65 EE, 65 EG, 58 J

[56] References Cited

U.S. PATENT DOCUMENTS

| | | | |
|---|---|---|---|
| 3,933,967 | 1/1976 | Taylor | 264/248 |
| 4,340,222 | 7/1982 | Kerkenbush et al. | 273/61 R |
| 4,660,831 | 4/1987 | Kralik | 273/65 E |
| 4,765,853 | 8/1988 | Hoffman | 273/61 D X |

FOREIGN PATENT DOCUMENTS

| | | |
|---|---|---|
| 26059 | 7/1974 | Japan . |
| 4634 | 1/1978 | Japan . |
| 41297 | 9/1986 | Japan . |
| 88567 | 9/1991 | Japan . |

OTHER PUBLICATIONS

Database WPIL, Week 8551, Derwent Publications Ltd., London, GB AN 85-321253 & JP-A-60 225 581 (Molent) Abstract.
Dr. Saechiling 'International Plastics Handbook' 1983, MacMillan Publishing Co., Inc. Chapter; Thermoplastics, pp. 154-157 and 214-216 Very Specially Table: 32, New York, US.

Primary Examiner—George J. Marlo
Attorney, Agent, or Firm—Antonelli, Terry, Stout & Kraus

[57] ABSTRACT

A ball for ball game, comprising a base body composed of two hemispherical hollow bodies formed by injection-molding a thermoplastic elastomer and bonded together to form a spherical hollow body, said base body containing and sealing compressed air injected therein through an air-injection valve provided at an appropriate portion of one of said two hemispherical hollow bodies, and a plurality of leather panels bonded by means of an adhesive to the surface of said base body, wherein a 10% tensile stress of said thermoplastic elastomer forming said base body ranges from 30 to 190 kg/cm$^2$. Various properties of said ball such as shock-absorptivity, shape-maintaining property, impact resilience and the like can be set within appropriate ranges.

3 Claims, 10 Drawing Sheets

GAME BALL

BACKGROUND OF THE INVENTION

The present invention relates to a ball for ball games such as a soccer ball, which contains compressed air sealed therein, hits a player's body directly or is kicked with his leg, and so forth. The present invention also relates to a mold for forming a base body of such a ball.

With a ball of this type, since it directly hits a player's body, the hitting impact or shock needs to be mitigated. In addition the ball needs to have an appropriate impact resilience for ease in controlling it with a player's body or leg. Such characteristics are exhibited by the base body of the ball. The base body of the most conventional type comprises a tube of butyl rubber for containing and sealing compressed air and a thread wound reinforcement layer formed by winding the surface of the tube with a thread of nylon or the like having a length of about 3000 m along endless track. Such a base body is bonded at its surface with a plurality of leather panels, with intervention of a thin rubber layer. In the case of a soccer ball, the whole base body thereof is covered with twelve pentagonal leather panels and twenty hexagonal leather panels.

The base body of the above arrangement is formed with many production steps, taking a long time. To overcome such disadvantage, there has been proposed a method for integrally forming a base body of a ball by rotational molding of a thermoplastic elastomer (Japanese Unexamined Patent Publication No. 4634/1978).

In the art disclosed in the above Publication a thermoplastic elastomer, or specifically a polyester elastomer is molded or formed into a base body of a ball. A commercially-available elastomer usually has an extremely wide range of 10% tensile stress from 1 to 200 kg/cm$^2$. It is extremely difficult to fabricate a ball for practical use without limiting such stress of the base body thereof. This is because insufficient tensile stress would cause the ball to entirely expand with elapse of time due to the internal pressure of compressed air. In contrast, too much tensile stress would cause little deformation of the ball upon impact and hence bring a pain to a player when hit with the ball. In addition a tensile stress out of a pretermined range results in an undesired impact resilience and hence improper bounce.

With regard to molding of a ball, there is known an art for forming a ping-pong ball wherein two hemispherical hollow bodies are formed by injection molding and then bonded together to form a spherical ball, as disclosed, for example, in Japanese Examined Patent Publication No. 41297/1986. As well, there is known another art wherein two hemispherical hollow bodies are formed as a surface layer of a base body and the base body is capped with the two hemispherical hollow bodies, as disclosed, for example, in Japanese Examined Patent Publication No. 26058/1974.

Figure 12:
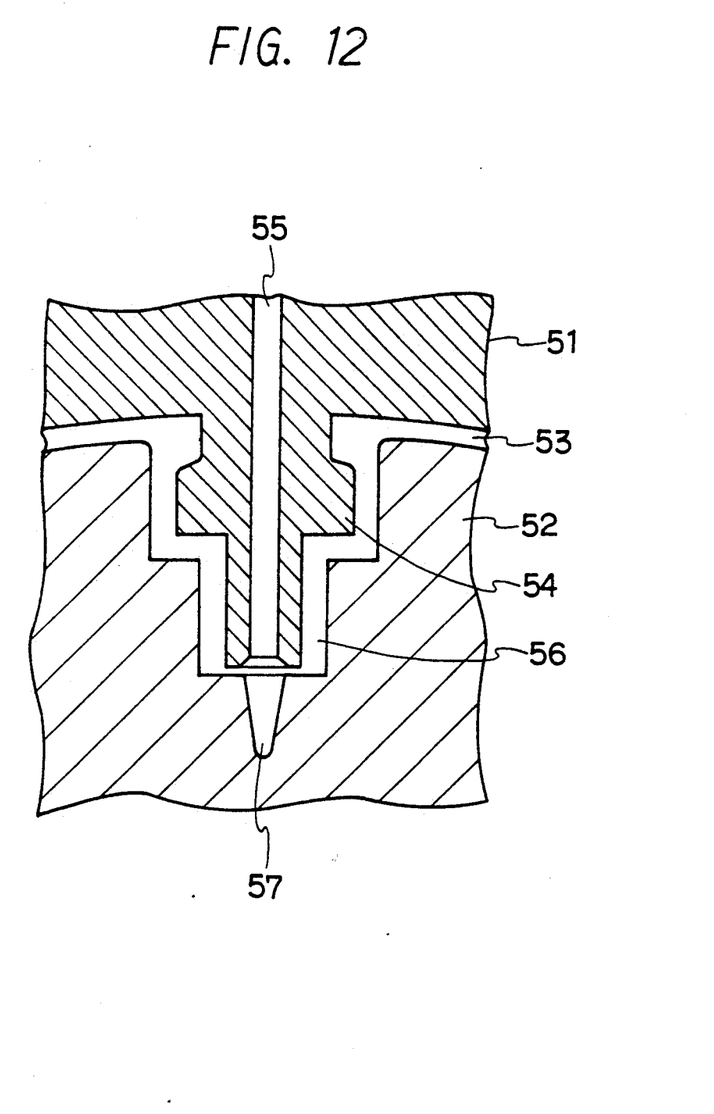
FIG. 12 is a sectional view showing a conventional mold for ball.

Further, the present inventors have formerly proposed an arrangement wherein a base body is formed of a spherical hollow body which is composed of two hemispherical hollow bodies obtained by injection-molding a thermoplastic elastomer. The two hollow bodies are bonded together. This arrangement is disclosed in Japanese Unexamined Utility Model Publication No. 88567/1991. In this publication, one hemispherical hollow body is molded integrally with a valve at the center thereof. FIG. 12 of the instant application illustrates such a mold for forming such valve-integrated hemispherical hollow body. Denoted by numerals 51 and 52 are an upper mold and a lower mold, respectively, between which a cavity 53 for forming one hemispherical hollow body is defined. A core 54 is provided for forming a valve and integrally formed with the upper mold 51. A runner 55 for injection molding is extending centrally through the core 54. Denoted by numeral 56 is a valve-forming cavity, by numeral 57 a recessed portion defined in the lower mold 52 at a position corresponding to the exit of the runner 55 for facilitating the flow of molten thermoplastic elastomer from the runner 55 to the cavity 56.

The mold structure shown in FIG. 12 is developed for ease of releasing a molded hemispherical hollow body from the upper mold 51 having the core 54. However, there still remains troublesome work for the operator, for example, to withdraw the molded hemispherical hollow body to release it from the upper mold 51.

A large-diameter portion of the core 54 needs to be relatively large for maintaining a valve rubber, but if it is too large, the hemispherical hollow body is hard to be released. Accordingly, the diameter of the large-diameter portion is restricted in view of the difficulty of releasing. This results in weakened force for maintaining the valve rubber and insufficient air-sealing.

There is another problem that a mass of resin formed in the recessed portion 57 needs to be removed by the operator after the molding.

The present invention has been achieved in view of the above-mentioned circumstances. More specifically, the present inventors have found, as a result of various experiments on the requirements for a ball, wherein base bodies were formed using various thermoplastic elastomers, the fact that if the tensile stress to which the inventors' attention is directed is set within a given range, various properties of a ball such as shock-absorptivity, shape-maintaining property, impact resilience and the like can be set within appropriate ranges. Thus, a first invention of the present invention has been achieved.

On the other hand, a second invention of the present invention is designed so that after molding of a hemispherical hollow body, the body can be automatically released without leaving an unnecessary mass of resin on the body.

SUMMARY OF THE INVENTION

According to the first invention of the present invention, there is provided a ball for a ball game, comprising a base body composed of two hemispherical hollow bodies formed by injection-molding a thermoplastic elastomer and bonded together to form a spherical hollow body, said base body containing and sealing compressed air injected therein through an air-injection valve provided at an appropriate portion of one of said two hemispherical hollow bodies, and a plurality of leather panels bonded by means of an adhesive to the surface of said base body, wherein a 10% tensile stress, e.g. a 10% elongation or yield under tensile stress, of said thermoplastic elastomer forming said base body ranges from 30 to 190 kg/cm$^2$.

According to the second invention of the present invention, there is also provided a mold for injection-molding a hemispherical hollow body formed of a thermoplastic elastomer, which mold comprises a first mold having a hemispherical convex molding surface, a second mold having a hemispherical concave molding surface larger in size than said hemispherical convex molding surface, on which second mold is superposed said first mold to form a cavity for molding said hemispherical hollow body, a first valve mold removably mounted centrally of the surface of said hemispherical convex molding surface of said first mold, for forming an outer form of a valve and an inside and small-diameter portion of a valve rubber insertion hole, a second valve mold removably mounted centrally of the surface of said hemispherical concave molding surface, for forming an intermediate and large-diameter portion of said valve rubber insertion hole and an outside and small-diameter portion thereof while forming a cavity for said valve with said first mold, and a plurality of gates formed in the periphery of said outside and small-diameter portion of said valve rubber insertion hole associated with said second valve mold, for injecting therethrough a plasticized or molten thermoplastic elastomer into said cavities.

In using such a mold, the first and second molds, and the first and second valve molds are respectively superposed one on the other and clamped to form the cavity into which a heat-molten thermoplastic elastomer is injected to mold a hemispherical hollow body integrally with a valve. After the molding, the first mold and first valve mold are released from the hemispherical hollow body. At this time the hemispherical hollow body is stuck to the upper mold and supported by the second valve mold. Subsequently, the second valve mold is withdrawn from the upper mold in the direction opposite to the face holding the hemispherical hollow body. Thereafter, the second valve mold is made to return to its original position in the upper mold to press down with the tip thereof the hemispherical valve body, thus releasing it from the upper mold.

The plurality of gates are formed in the periphery of the outside and small-diameter portion of the valve rubber insertion hole associated with the second valve mold. Unnecessary resin is cut off at end portions of the gates.

DETAILED DESCRIPTION

Figure 1A:
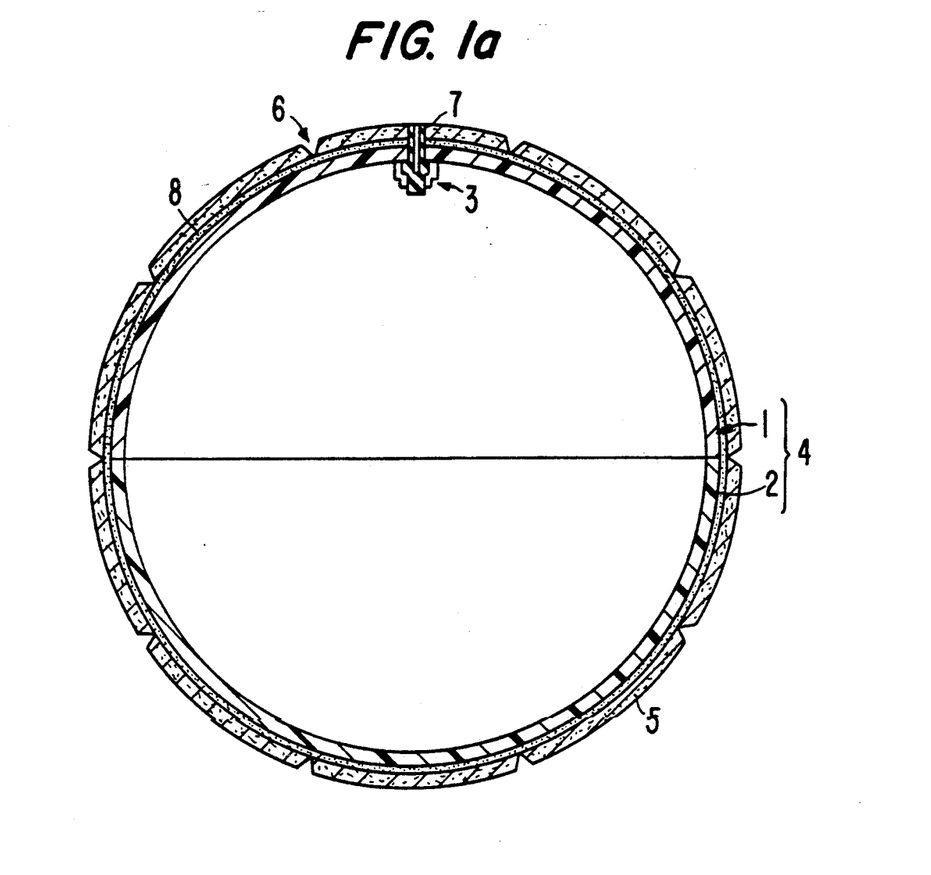
FIG. 1a is a sectional view showing an embodiment of a ball according to the first invention of the present invention.
Figure 1B:
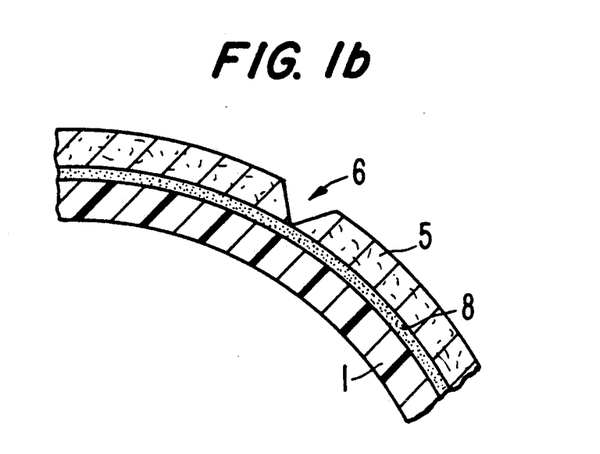
FIG. 1b is an enlarged view of a portion of the ball shown in FIG. 1a depicting the adhesive between the leather panels and hemispherical hollow bodies.

Referring to FIGS. 1a and 1b, numeral 1 and 2 denote two hemispherical hollow bodies, respectively which are formed from a thermoplastic elastomer by injection molding to be described later. One hemispherical hollow body 1 is integrally formed at the center thereof with a valve 3. The two hemispherical hollow bodies 1 and 2 are bonded together at peripheral edges thereof by fusion to form a base body 4.

The 10% tensile stress of the thermoplastic elastomer forming the base body 4 and valve 3 needs to be set within the range of 30 to 190 kg/cm$^2$. If the value does not reach 30 kg/cm$^2$, the ball is expanded and deformed by the internal pressure and hence cannot maintain its designed size. On the contrary, the value exceeding 190 kg/cm$^2$ results in too small deformation upon impact and hence makes the touch of the ball hard. Therefore, the player comes to feel a pain at the body, hand, leg or the like when hit by such ball. In addition, too large a value results in unsuitable bounce for controlling the ball; hence it is impossible to realize a ball suitable for games. If the 10% tensile stress is within the above-mentioned range, the impact resilience (JIS K 6301) can be set within the range of 40 to 80%, which range assures a suitable bounce for soccer, basket ball, volley ball and the like.

The thermoplastic elastomer having the above-mentioned characteristics can be selected, singly or in combination, from the following elastomers of appropriate grade:

thermoplastic polyurethane:
PARABLENE (trademark, a product of NIPPON POLYURETHANE CO., LTD.), TAKE-RAKKU (trademark, a product of TAKEDA-BADISCH URETHANE INDUSTRIES LTD.), TOYOBO URETHANE (a product of TOYOBO CO., LTD.), Desmopan (trademark, a product of BAYEL CO., LTD.), MIRACTRAN (trademark, a product of NIPPON MIRACTRAN CO., LTD.), ELASTOLLAN (trademark, a product of NIPPON ELASTOLLAN INDUSTRIES LTD.), Pandex (trademark, a product of DAINIPPON INK & CHEMICALS, INC.), MOBILON (trademark, a product of NISSHINBO INDUSTRIES, INC.).

polyester-series thermoplastic elastomer:
PELPRENE (trademark, a product of TOYOBO CO., LTD.), HYTREL (trademark, a product of DU PONT-TORAY CO., LTD.), GRILUX E (trademark; a product of DAINIPPON INK & CHEMICALS, INC.).

polyamide-series thermoplastic elastomer:
PEBAX (trademark, a product of TORAY INDUSTRIES INC.), GRILUX A (trademark, a product of DAINIPPON INK & CHEMICALS, INC).

polyolefine-series thermoplastic elastomer:
SUMITOMO TPE (a product of SUMITOMO CHEMICAL CO., LTD.), MILASTOMER (trademark, a product of MITSUI PETROCHEMICAL LTD.), SANTOPRENE (trademark, a product of AES JAPAN LTD.), TAFMER (trademark, a product of MITSUI PETROCHEMICAL LTD.).

styrene-series thermoplastic elastomer:
TUFPRENE (trademark, a product of ASAHI CHEMICAL INDUSTRIES CO., LTD.), KRATON (trademark, a product of SHELL JAPAN LTD.), JSR TR (JAPAN SYNTHETIC RUBBER CO., LTD.).

polyvinylchloride-series thermoplastic elastomer:
SUMIFLEX (trademark, a product of SUMITOMO BAKELITE CO., LTD.), SANPRENE (trademark, a product of MITSUBISHI KASEI VINYL CO.).

polybutadiene-series thermoplastic elastomer:
JSR RB (a product of JAPAN SYNTHETIC RUBBER CO., LTD.), soft nylon
GRILUX N (trademark, a product of DAINIPPON INK & CHEMICALS, INC.).

In the case of forming a soccer ball, the base body 4 is bonded, at the surface thereof, by means of adhesive 8 with leather or synthetic leather panels 5,5 hexagonally and pentagonally cut. Side edges of each of the panels 5,5 are obliquely cut to form grooves 6,6 drawing boundaries with adjacent panels 5,5. Numeral 7 denotes a valve rubber as a component of the valve 3 which is removably mounted into the valve 3 and into which a needle of air injector is inserted to permit compressed air to be injected into the base body 4.

A base body of a size 5 soccer ball was formed with a thickness of 1.3 mm using as the thermoplastic elastomer material a polyester-series elastomer, or specifically PELPRENE (trademark, a product of TOYOBO CO., LTD.). The base body was then bonded with leather panels and injected with compressed air to an internal pressure of 0.6 kg/cm$^2$, which valve was as same as that for a common soccer ball. The 10% tensile stress and impact resilience of the resulting ball were 74 kg/cm$^2$ and 50.4%, respectively and suitable for a soccer ball. The impact or shock caused when the ball hit a player was almost the same as that caused by a conventional ball of a thread wound structure; accordingly, the player felt little pain. In addition, deformation of the ball when kicked was appropriate, and the touch thereof was preferable. Deformation due to expansion did not occur after the ball was allowed to stand for 6 months with its internal pressure maintained. Thus, it was confirmed that the ball was excellent in shape-maintaining property without expansion.

Described next is a mold for forming the base body 4 of the ball.

Figure 9:
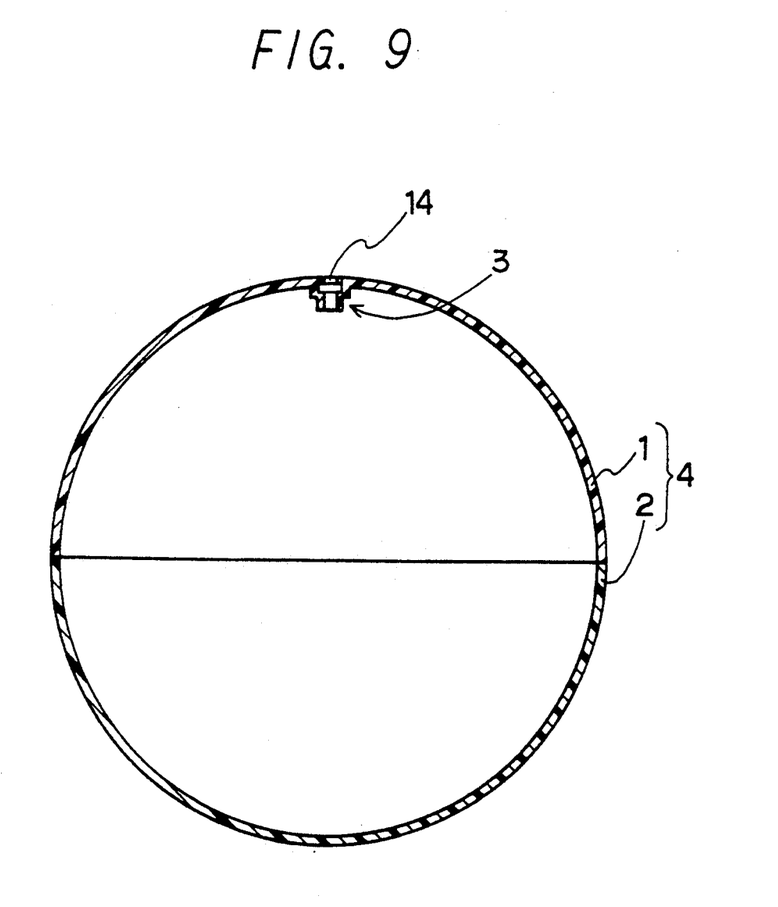
FIG. 9 is a sectional view showing a base body of the ball.
Figure 10:
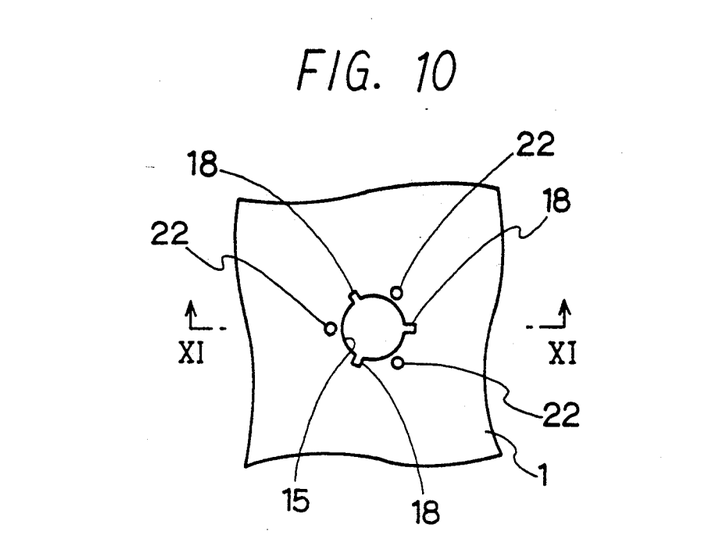
FIG. 10 is a plan view showing a valve portion of the base body in FIG. 9.
Figure 11:
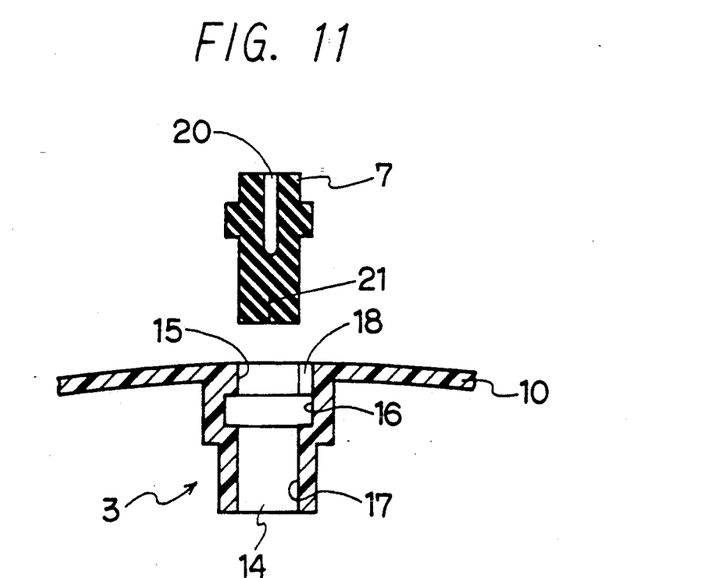
FIG. 11 is a sectional view taken along XI—XI line of FIG. 10 for showing a state where a valve rubber is removed from the valve of the base body.

Referring to FIGS. 9 to 11, numerals 1 and 2 denote the above-mentioned two hemispherical hollow bodies, respectively which are formed from the thermoplastic elastomer by injection molding. These two hemispherical hollow bodies 1 and 2 are bonded together at their peripheral edges by heat fusion, to form the base body 4. A valve 3 is formed integrally with the hemispherical hollow body 1, inwardly projected at the center of the body 1, and has a valve rubber insertion hole 14. The valve rubber insertion hole 14 comprises an outside and small-diameter portion 15 situated on the surface-side of the ball and having a diameter of about 6 to 8 mm and a length of about 3 to 5 mm, an intermediate and large-diameter portion 16 having a diameter of about 9.5 to 11.5 mm and a length of about 3 to 4.5 mm, and an inside and small-diameter portion 17 having a diameter of about 5 to 6 mm and a length of about 9 to 10 mm. A slit 18 is provided in the outside and small-diameter portion 15 for facilitating withdrawal of a second valve mold 27 (shown in FIG. 2). A valve rubber 7 is shaped as substantially the same as or slightly larger than the contour of the valve rubber insertion hole 14. Denoted by numeral 20 is a small aperture formed centrally of the valve rubber 7, for insertion of a needle of air injector, and by numeral 21 is a cut. In FIG. 10, denoted by numerals 22, 22, 22 are small circular traces formed by cutting off the end portions of resin gates.

Figure 2:
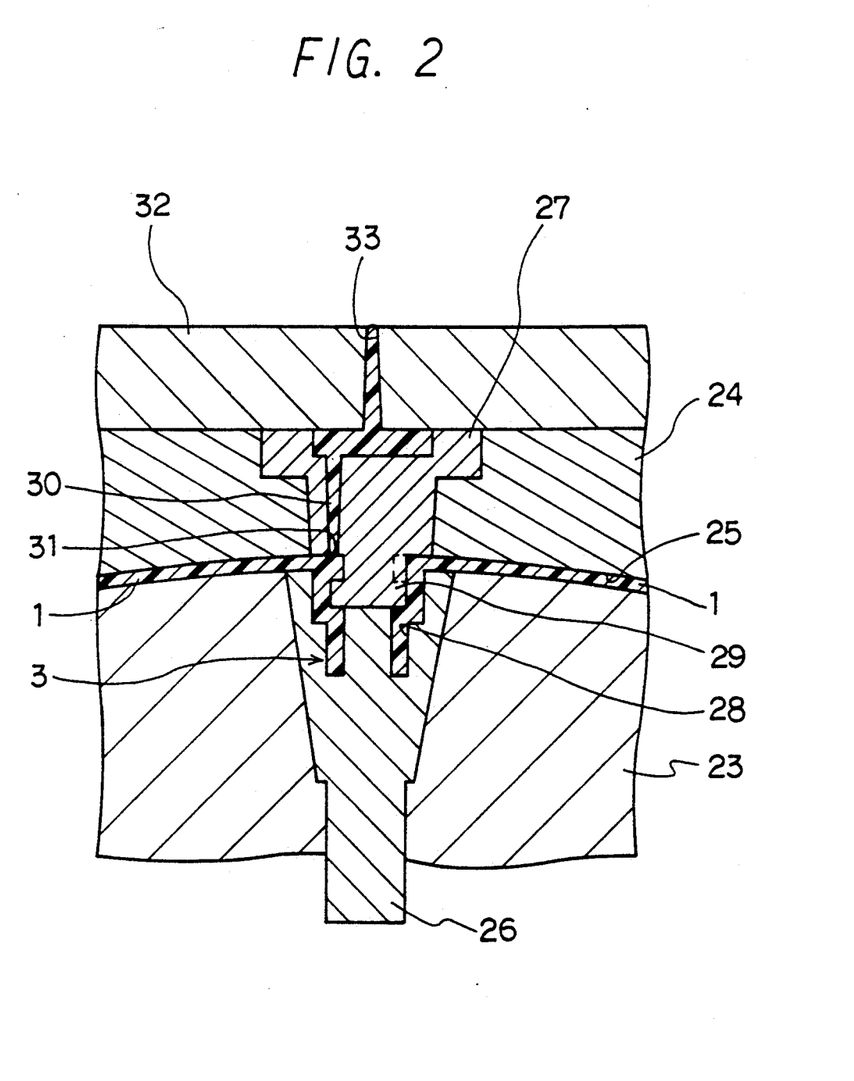
FIG. 2 is a sectional view showing an embodiment of a mold for ball according to the second invention of the present invention.

Referring to FIG. 2, denoted by numeral 23 is a first mold having a hemispherical convex molding surface, and by numeral 24 a second mold having a hemispherical concave molding surface larger in size than the hemispherical convex molding surface of the first mold 23, which molds 23 and 24 are superposed one on the other to form a cavity 25 for forming the hemispherical hollow body. In forming the base body 4 of a soccer ball of size 5, the cavity 25 is set to have a diameter of 21.5 cm at the peripheral end thereof and a thickness of 1.0 mm. Numeral 26 denotes a first valve mold disposed centrally of the hemispherical convex surface of the first mold 23 and removable in the direction toward the center of the hemisphere, which valve mold is for forming the outer form of the valve 3 and the inside and small-diameter portion 17 of the valve rubber insertion hole 14. Numeral 27 denotes a second valve mold disposed centrally of the hemispherical concave surface of the second mold 24 and removable in the direction outwardly from the second mold 24, i.e., in the direction toward the side opposite to the first mold 23, which valve mold is for forming the intermediate and large-diameter portion 16 and outside and small-diameter portion 15 of the valve rubber insertion hole 14. A cavity 28 for forming the valve 3 is defined between the first and second valve molds 26 and 27. Three thin-plate projections 29 are provided in the outside and small-diameter portion 15 associated with the second valve mold 27, for forming the slit 18. Three runners 30 are formed in the second valve mold 27 for injecting heat-plasticized or molten thermoplastic elastomer into the cavity 25 through gates 31 disposed in the periphery of the outside and small-diameter portion 15 of the valve rubber insertion hole 14. Numeral 32 denotes a sprue mold disposed outside the second mold 24 and second valve mold 27, for providing a sprue 33 to be contacted with a nozzle of a resin-injector (not shown), through which sprue 33 resin or thermoplastic elastomer is supplied to the runners 30.

With reference to FIGS. 3 to 8, steps of releasing the hemispherical hollow body 1 thus molded from the molds are sequentially described.

Figure 3:
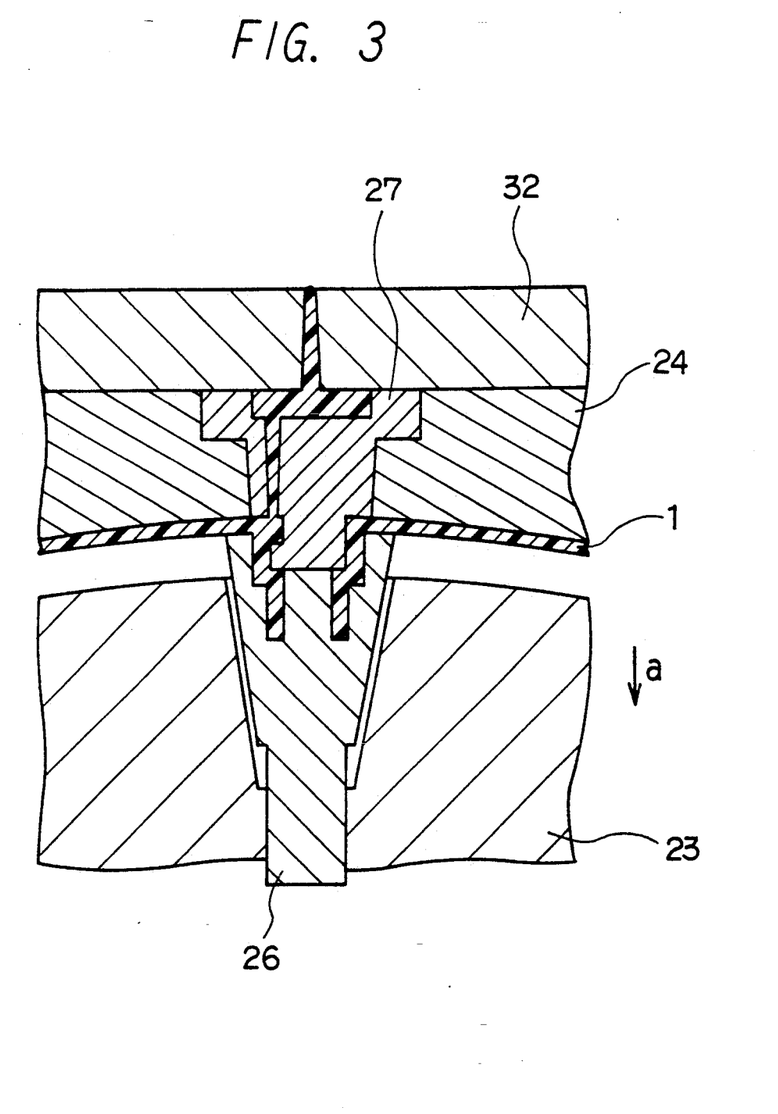
FIGS. 3 through 8 are each a sectional view showing how the components of the mold in FIG. 2 move.
Figure 4:
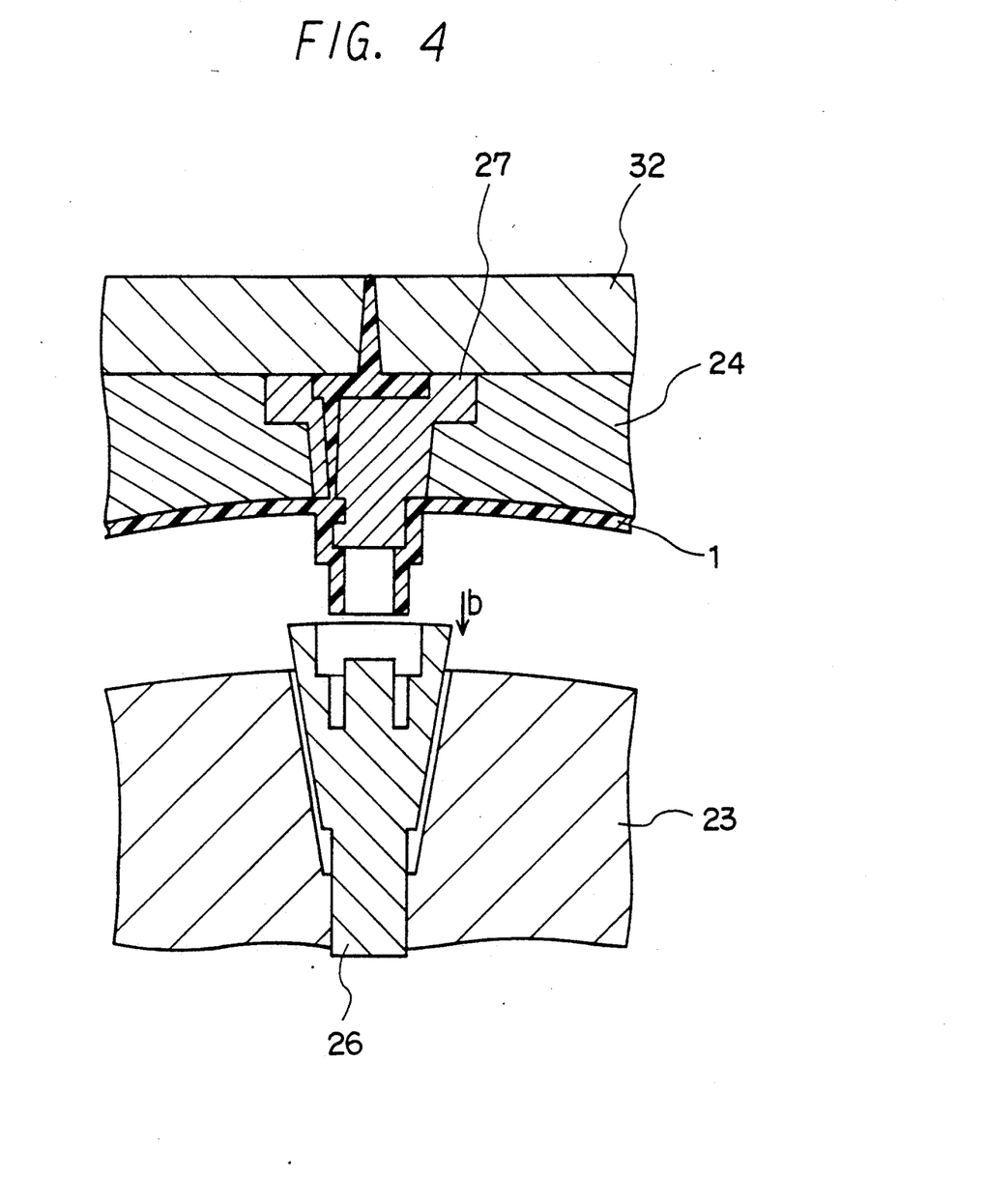
Figure 5:
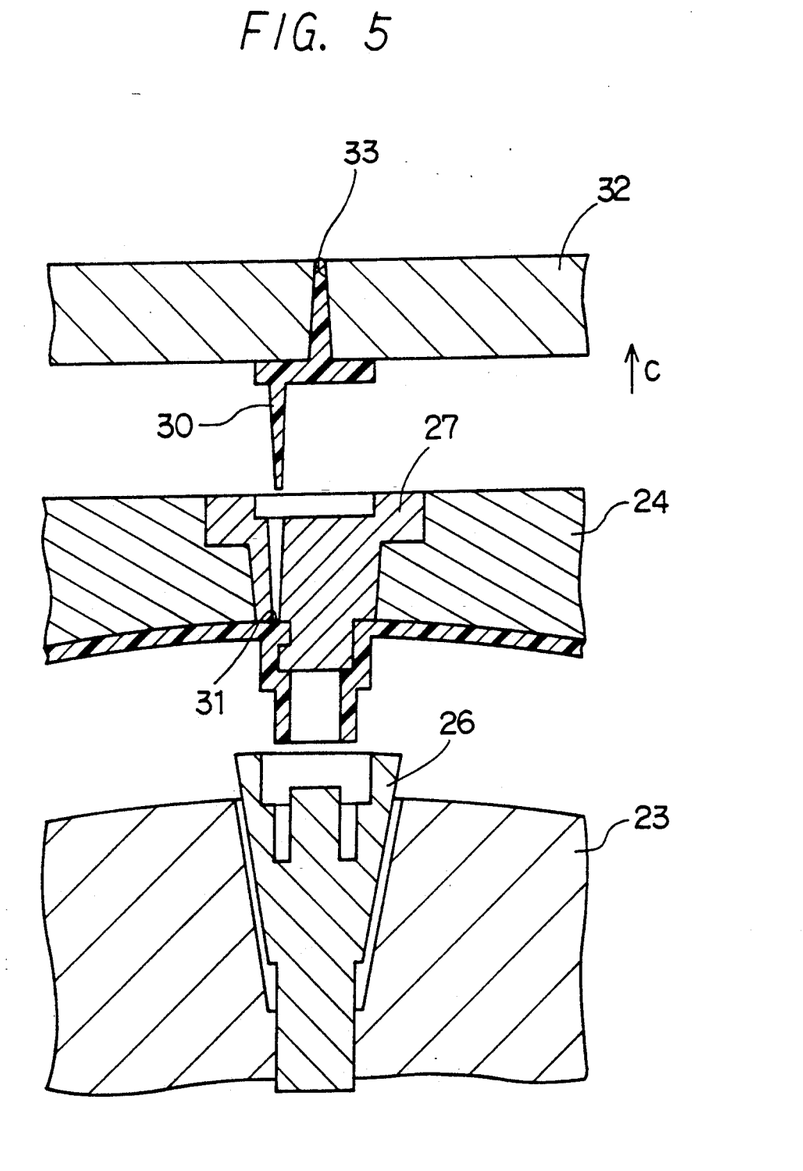
Figure 6:
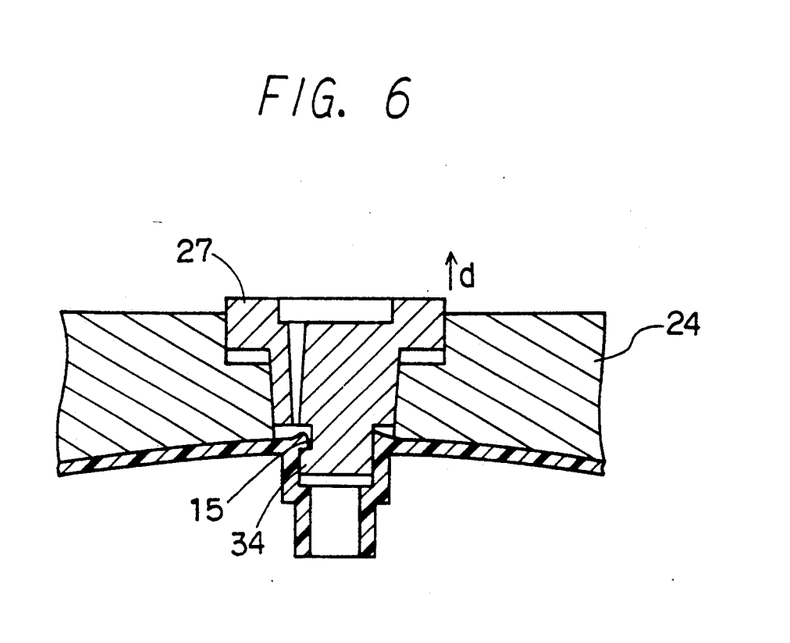
Figure 7:
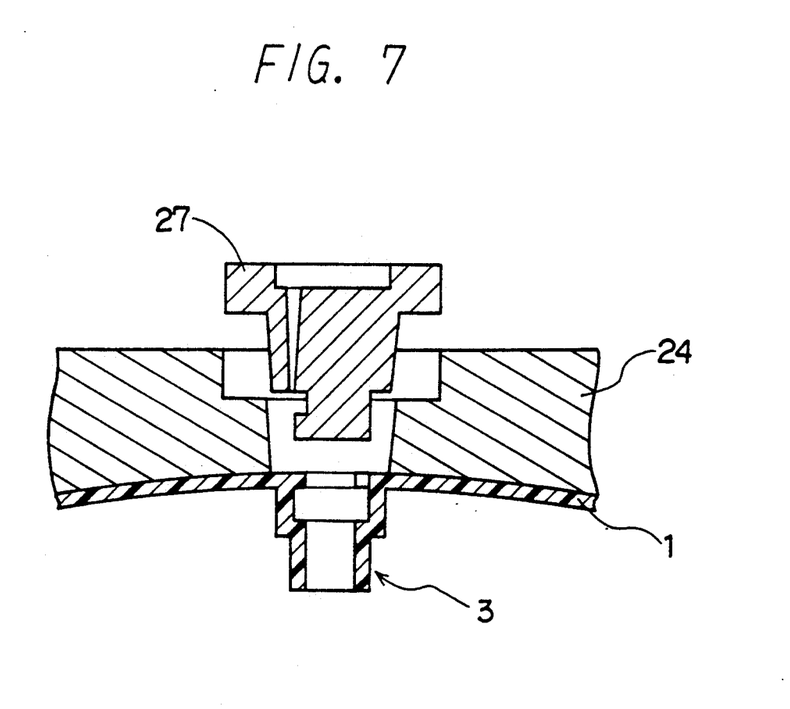
Figure 8:
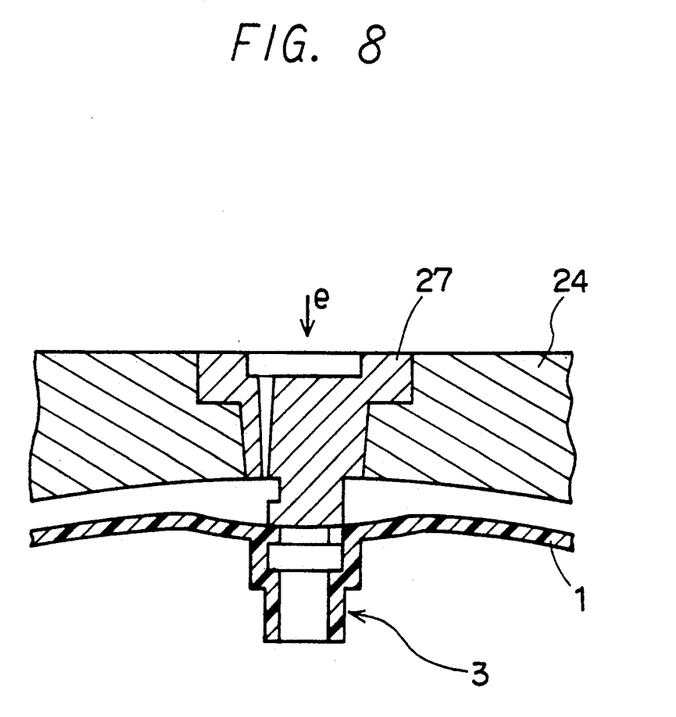

Firstly, the first mold 23 is moved in the direction indicated by arrow a, to be released from the first valve mold 26 and the hemispherical hollow body 1 (see FIG. 3). Subsequently, the first valve mold 26 is moved in the direction indicated by arrow b, to be released from the hemispherical hollow body 1 (see FIG. 4). Simultaneously with or subsequent to the movement of the first valve mold 26, the sprue mold 32 is moved outwardly or in the direction indicated by arrow c, to be released from the second mold 24. At this moment, the resin in the tip end portion of the runner 30 is cut at the gate 31, and the resin in the sprue 33 and in the runner 30 is moved upwardly in the drawing, together with the sprue mold 32 (see FIG. 5). Thereafter, the second valve mold 27 is made to move in the direction indicated by arrow d in FIG. 6, to be released from the second mold 24. At this time, although a diametrically-enlarged portion 34 at the lower end of the second valve mold 27 is caught by the resin in the outside and small-diameter portion 15, the presence of the resin in the slit 18 enables it to be withdrawn therefrom without causing any damage. Since the inside and small-diameter portion 17 has been already released or withdrawn, the resin in the portion 17 becomes prone to deform inwardly, or in the direction toward the axis thereof. Accordingly, the resin in the outside and small-diameter portion 15 is easy to enlarge and the release of the second valve mold 27 can further be facilitated. Thus, the second valve mold 27 is released from the hemispherical hollow body 1 (see FIG. 7). Next, the second valve mold 27 is moved downwardly as indicated by arrow e, to be fitted again into the second mold 24 (see FIG. 8). This causes the hemispherical hollow body 1 to be pressed down with the lower end of the second valve mold 27. As a result, the hemispherical hollow body 1 stuck to the second mold 24 can be released therefrom. Thus, the hemispherical hollow body 1 can be released from the molds by only moving the molds in a completely automatic fashion.

The hemispherical hollow body 1 integrated with the above-mentioned valve 3 is completed having an outer circumference of about 67 cm at the end thereof, and a thickness of about 0.5 to 2.5 mm. This hemispherical hollow body 1 is bonded with the counterpart hemispherical hollow body 2 not having a valve, at the peripheral ends thereof by heat-fusion to form a base body 4. Specifically, the peripheral end portions of these two hemispherical hollow bodies 1 and 2 are heated to be plasticized molten, and bonded to each other to form a spherical hollow base body 4. The heating of the peripheral end portions of the two hemispherical hollow bodies 1 and 2 is carried out in such a manner that the two bodies 1 and 2 are disposed with their peripheral end portions standing opposite to each other with a predetermined space, and a heating plate is interposed in such space. The heating plate is slightly spaced apart from the opposite end portions of the respective hemispherical hollow bodies 1 and 2; hence the heating plate will not be brought into contact with the peripheral end portions of the bodies 1 and 2 so that the peripheral end portions are not deformed. When bonding of the hollow bodies 1 and 2, the heating plate is removed from the space and the two 1 and 2 are superposed one on the other. The base body 4 thus formed is bonded, at its surface, with twenty hexagonal leather panel and twelve pentagonal leather panel. Thus, a soccer ball of the invention is completed.

According to the first invention of the present invention, two hemispherical hollow bodies are molded from a thermoplastic elastomer material, and bonded together to form a base body of a ball, while setting the 10% tensile stress of this material within the range of 30 to 190 $kg/cm^2$, thereby meeting the requirements for a ball such as shock-absorptivity, impact resilience, shape-maintaining property and the like.

According to the second invention of the present invention, a hemispherical hollow body formed integrally with a valve having an undercut can be automatically released by only moving the molds used, thereby eliminating operator's work.

Further, gate portions of the hemispherical hollow body can be cut off upon movement of the mold with leaving only the traces thereof, which traces will not exert any influence on the structure and use of the base body. Therefore, the problem of leaving a mass of resin or the base body as described in the prior art can be overcome.

In addition, since the base body is composed of two hemispherical hollow bodies formed by injection molding, it becomes possible to fabricate the base body in a short time without necessitating labor. This results in a remarkable decrease in production cost as compared with the fabrication of a base body by rotational molding as well as the fabrication of a conventional thread-wounded ball.

What is claimed is:

1. A ball for a ball game, comprising a base body consisting essentially of two hemispherical hollow bodies formed of injection-molded thermoplastic elastomer and bonded together at peripheral edges thereof to form a spherical hollow body, compressed air sealingly contained in said base body, an air-injection valve provided at an appropriate portion of one of said two hemispherical hollow bodies and through which compressed air can be injected into the base body, and a plurality of leather panels bonded by means of an adhesive to the surface of said base body, and wherein said thermoplastic elastomer has a 10% tensile stress within the range of 30 to 190 $kg/cm^2$.

2. The ball according to claim 1, wherein said peripheral edges of said hemispherical hollow bodies are joined together by a fusion bond.

3. The ball according to claim 1, wherein said ball consists essentially of said base body and said leather panels bonded by said adhesive to the surface of said base body.

* * * * *